Dec. 26, 1939.  R. P. SMITH ET AL  2,185,095
REGENERATION OF WASTE FERROUS SULPHATE LIQUOR
Filed Oct. 29, 1938
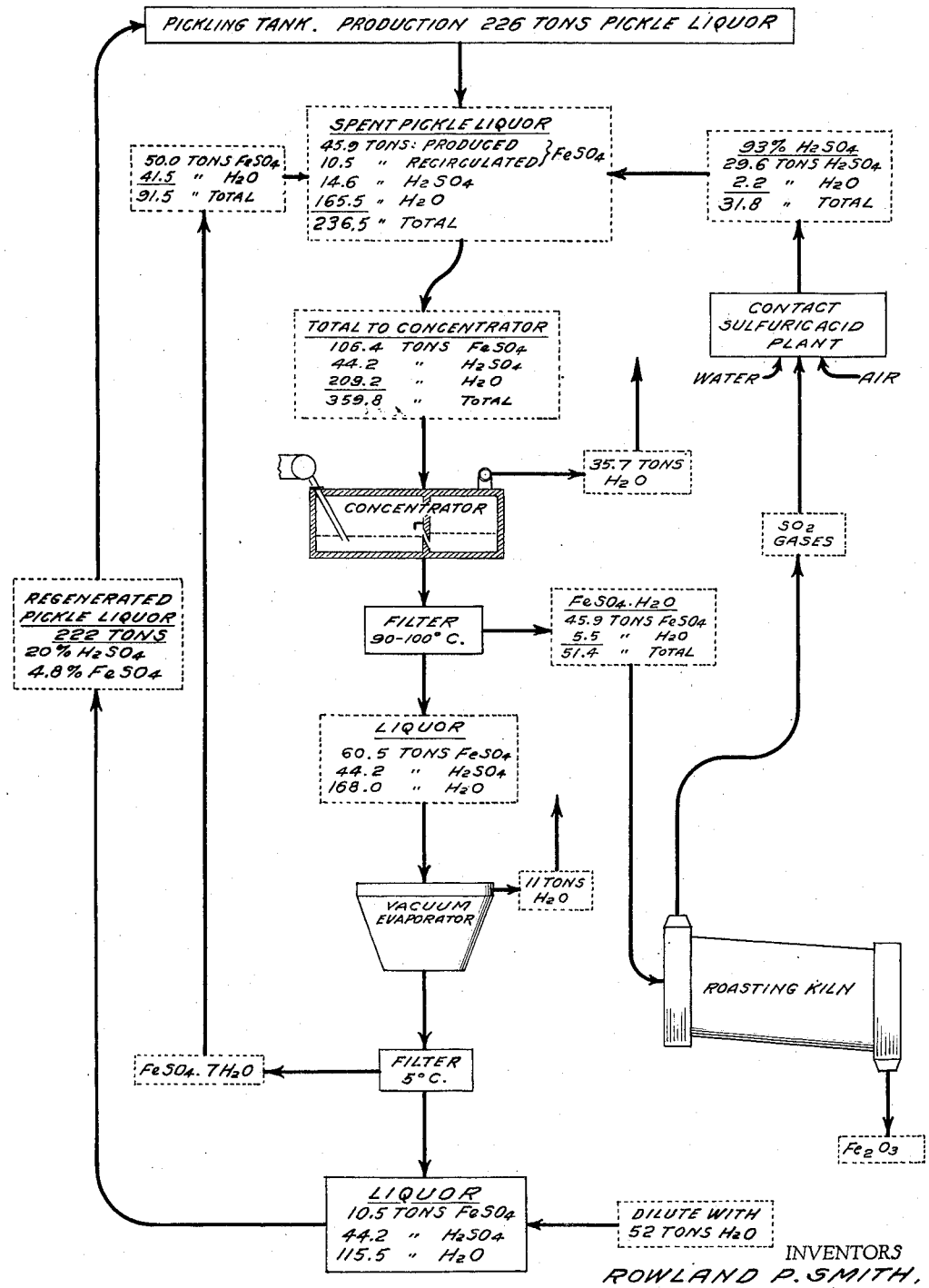
INVENTORS
ROWLAND P. SMITH,
JOHN BELDING,
BY  Wm. P. Spielman
ATTORNEY.

Patented Dec. 26, 1939

2,185,095

UNITED STATES PATENT OFFICE 2,185,095

REGENERATION OF WASTE FERROUS SULPHATE LIQUOR

Rowland P. Smith, Stamford, and John Belding, Old Greenwich, Conn., assignors to Chemical Construction Corporation, New York, N. Y., a corporation of Delaware Application October 29, 1938, Serial No. 237,617

17 Claims. (Cl. 23—126)

This invention relates to the regeneration of spent ferrous sulphate liquors for reuse in pickling iron, steel and other metal articles, leaching and dissolving ores and similar purposes. In its more specific aspects, the invention relates to a cyclic process of regeneration for spent ferrous sulphate liquors in which the ferrous sulphate formed during the leaching, dissolving or pickling is removed as ferrous sulphate monohydrate crystals, which are well adapted for ready recovery of their sulphur content as sulphuric acid. One object of the invention is to provide a regeneration process for spent pickle liquor, iron-containing by-products from the sulphuric acid treatment of ilmenite and other titanium ores, and similar by-product liquors containing ferrous sulphate and requiring regeneration. A further object is the provision of a regeneration cycle in which the ferrous sulphate is recovered as monohydrate by the deliberate addition of further amounts of ferrous sulphate to the solution. A still further object resides in the provision of a cyclic regeneration process in which the amount of water evaporation is reduced to a minimum, and which is therefore economical in fuel and power requirements. Other objects of the invention will become apparent from the following specification, when taken with the claims appended thereto.

Heretofore it has been proposed to recover ferrous sulphate heptahydrate from spent pickle liquor and similar waste solutions by concentrating the liquor to the point where the ferrous sulphate will crystallize out upon cooling as heptahydrate or copperas. It has also been proposed to carry out the concentration, preferably under a vacuum and at relatively low temperatures, to the stage wrere the sulphuric acid concentration of the waste liquor is 55% or higher, and then to filter off ferrous sulphate monohydrate. The heptahydrate obtained by the first process contains almost as much water as ferrour sulphate, and must be further dehydrated before it can be utilized for the recovery of its sulphur content. Such dehydration is difficult to carry out without the use of expensive equipment which constitutes a heavy burden upon a steel mill that is only interested in pickling. While the vacuum concentration process produces ferrous sulphate monohydrate, and therefore overcomes the difficulty of dehydration, it requires in itself a complicated equipment and uses considerable amounts of fuel. For these reasons, the regeneration of spent pickle liquors and the recovery of sulphuric acid therefrom still remains a difficult problem in the steel industry.

The present invention is based on our discovery that ferrous sulphate monohydrate can be crystallized from spent pickle liquorrs and similar waste ferrous sulphate solutions by the addition of sulphuric acid and further amounts of ferrous sulphate heptahydrate. Moreover, we have found that an amount of ferrous sulphate monohydrate can easily be removed by this method that is equal to or even greater than the amount formed in the pickling process, simply by adding sufficient amounts of acid and ferrous sulphate heptahydrate and evaporating a relatively small proportion of the water contained in the solution.

In its broader aspects our invention comprises any process in which spent pickle liquor or waste ferrous sulphate solutions from other sources are regenerated by adding a sulphuric acid and ferrous sulphate heptahydrate, concentrating, and filtering at any temperature at which ferrous sulphate monohydrate can be separated out in the necessary quantity. The amounts of water to be eveporated are, of course, dependent upon the filtration temperature desired and upon the amount of acid added. For example, one may add copperas to the spent pickle liquor together with the amount of sulphuric acid necessary to restore it to its original free acid content and after evaporating sufficient water conduct the filtration at relatively low temperatures, and this can be accomplished with substantial savings in the amount of water evaporation by reason of the high sulphuric acid and ferrous sulphate content of the original solution. We have found, however, that the extent to which the concentration must be carried is materially less when higher filtration temperatures above 65° C. are used, and our preferred process is one in which the highest practical filtration temperature range of 90° C. to the boiling point of the solution is employed. When the solution is filtered at these high temperatures only about six moles of water need be evaporated for each mole of ferrous sulphate produced, and the high heat content of the filtrate improves the efficiency of the subsequent vacuum cooling step. Accordingly, we much prefer to determine the amount of water evaporation by the highest practical filtration temperature range, which is 10–100° C., and to evaporate off only so much water as will produce the required amount of ferrous sulphate monohydrate at these high temperatures.

While our invention in its broader aspects may comprise only the sequence of steps above outlined, we have developed a recirculatory process for complete regeneration of the pickle liquor or other acidified leaching or extracting solution that includes additional features of the invention. In this recirculatory process we apply the steps above outlined in such a manner that the ferrous sulphate heptahydrate added to the pickling liquor is obtained from the filtrate from the ferrous sulphate monohydrate production, and the liquor from which the heptahydrate was obtained is returned to the pickling process as a regenerated pickle liquor restored to its original acid concentration. As another feature of the invention, the sulfuric acid necessary for fortification of the spent solution is preferably obtained by mixing the ferrous sulfate monohydrate with coal or other carbonaceous material and roasting to produce sulphur dioxide, which is mixed with air and converted to sulphuric acid by the contact process in the presence of a platinum or vanadium catalyst.

In order to obtain ferrous sulphate heptahydrate or copperas from the filtrate from the ferrous sulphate monohydrate production a substantial cooling of the solution is necessary. If an amount of copperas is to be obtained from this source sufficient to maintain a saturated solution of ferrous sulphate monohydrate during the filtration step irrespective of the amount of iron present from other sources, then the filtrate must be cooled to subatmospheric temperatures, or water must be evaporated therefrom, or preferably both. While it is possible to obtain the required amount of copperas crystals by artificial refrigeration of the filtrate we greatly prefer to evaporate water from the solution, and we believe the most economical method is to carry out the cooling and evaporation simultaneously. However, it should be understood that in this step, just as in the previous concentration step, the filtration temperature and the amount of water evaporated are interdependent, and we do not wish to be limited to any specific set of conditions in this respect.

The amount of sulphuric acid to be added to the spent pickle liquor before concentration and filtration for the production of ferrous sulphate monohydrate may vary within wide limits, for we have found that under the conditions of our process high acid concentrations are not necessary. It should be noted that in this respect the present invention distinguishes sharply from the earlier vacuum concentration and crystallization processes referred to above, for such processes are entirely dependent upon evaporating the waste liquor until a strong sulphuric acid of 55-90% strength is obtained in order to throw the ferrous sulphate monohydrate out of solution. Since the strong acid recovered by these processes must be diluted with water to about 20% sulphuric acid, which represents ordinary pickling strength, it is apparent that the present invention offers great opportunities for savings in the cost of water evaporation by keeping the acid concentration relatively low during the filtration step. On the other hand, an amount of sulphuric acid sufficient to restore the spent pickle liquor to its original free acid content must be added somewhere during the cycle, and we have found that the most advantageous results are obtained by adding this amount of acid directly to the spent pickle liquor at the same step of the process in which the copperas is mixed with it. By so doing the amount of water evaporation is materially reduced, even when relatively low filtration temperatures are used in separating the monohydrate, and with the preferred high filtration temperatures the acid is recirculated through the process as a 20-30% sulphuric acid from which coarse ferrous sulphate monohydrate crystals can easily be obtained and filtered off. The crystals obtained from acid of this strength are large, granular and easy to separate by filtration or centrifuging without occluding appreciable quantities of mother liquor.

The invention will be illustrated in greater detail with reference to the accompanying drawing, the single figure of which is a flow sheet outlining the steps of our invention as applied to a pickling plant producing 226 tons of pickle liquor per 24 hour day. The process is illustrated as a batch process in which the amounts of materials present in each step are given, but it should be understood that the process is basically a continuous one and can be operated as such simply by integrating the quantities given with respect to time. It should also be understood that the quantities illustrated represent the process during its first cycle, and that any small inequalities in the amounts introduced and withdrawn from a given step will automatically equalize themselves when the cycle is repeated a number of times.

Referring to the drawing, the process outlined is one which was developed for a steel mill according to specifications which require a regenerated pickle liquor containing about 20% sulphuric acid and not more than 5% ferrous sulphate. Under these circumstances it was found that a final filtration temperature of 5° C. produced the most economical results, but it should be understood that the invention in its essential features is very flexible and can easily be modified to meet any reasonable specifications, either for pickling plants or for dissolving other ferrous materials.

With the foregoing explanation, the process constituting a preferred embodiment of the invention is easily understood by reference to the flow sheet. Spent pickle liquor from the pickling tank is mixed with sulphuric acid and with ferrous sulphate heptahydrate in predetermined quantities adapted to maintain a balanced regeneration cycle. The amount of sulphuric acid added is that chemically equivalent to the amount used up in the pickling process or, stated differently, the amount of acid added is sufficient to restore the spent liquor to its original free acid content. In the process illustrated, 45.9 tons of ferrous sulphate are produced in the pickling tank per 24 hour day and this is the equivalent of 29.6 tons of 100% $H_2SO_4$. It is evident, therefore, that the addition of 29.6 tons of 100% sulphuric acid, or 31.8 tons of 93% sulphuric acid will restore the liquor to its original free acid content and therefore this amount of acid is preferably mixed directly with the spent pickle liquor as a part of the first step of the regeneration cycle. Of course, it is possible to introduce a part of this make-up acid elsewhere in the cycle, but this modification of the invention is less advantageous.

The amount of copperas or ferrous sulphate heptahydrate to be mixed with the spent pickle liquor along with all or part of the sulphuric acid is determined primarily by the desired filtration temperatures and secondarily by the extent of concentration to be used, as has been pointed out. In the process illustrated, the optimum filtration temperatures of 90-100° C. are used, and an amount of FeSO₄ is added as copperas roughly equivalent to the amount produced in the pickling tank. By adding this amount of copperas, an amount of ferrous sulphate monohydrate equal to the amount produced in the pickling tank can be filtered off at 90–100° C. with the evaporation of only 35.7 tons of water per 24 hour day, which represents only a fraction of the amount of evaporation that would otherwise be necessary. Stated in other words, the removal from the cycle of an amount of ferrous sulphate monohydrate chemically equivalent to the amount of acid that must be added to regenerate the liquor is necessary and this removal is accomplished by adding along with the sulphuric acid only so much solid ferrous sulphate heptahydrate as would be needed to maintain a saturated solution in the filtration step under the desired conditions of filtration temperatures and extent of concentration if no other iron were present.

The next step of the process is one of concentration and filtration. In the drawing a drum-type concentrator of the type described in reissue Patent No. 19,064 is illustrated, and it is an advantage of the invention that a simple and highly efficient concentrator of this type can be employed if desired. It should be undestood, however, that any known or approved type of concentration may be resorted to in this step, as its only purpose is to remove a relatively small amount of water as an aid in the subsequent filtration. The filtration step can likewise be carried out in any type of equipment and, in fact, it is possible to remove the ferrous sulphate monohydrate crystals by decantation without employing a filter at all if this should be desirable. Accordingly, it should be understood that the term "filtering" is intended to include any suitable means for obtaining a clean separation of the solids from the liquid whether a filter is employed or otherwise.

While the ferrous sulphate monohydrate obtained from the filtration step may be used for any suitable purpose, we believe that the salt in this low degree of hydration is best adapted for the recovery of its sulphur content as sulphuric acid for reuse in the pickling or leaching process. We have found that a mixture of ferrous sulphate monohydrate with 4–8% of its weight of coal, sulphur, or other reducing agent can be roasted in a rotary kiln by direct application of hot gases from a coal or coke burning furnace, or from an oil or sulphur burning furnace to produce a sulphur dioxide mixture that is completely free from sulphur trioxide and is therefore ideally suited for the contact sulphuric acid process. Suitable amounts of sulphur, iron pyrites or other sulphur-bearing material may also be roasted or burned in such a rotary kiln along with the ferrous sulphate monohydrate in order to make up for any losses of sulphur in the system, and the resulting sulphur dioxide gas mixture is preferably scrubbed, dried and introduced directly to a contact sulphuric acid plant employing a vanadium catalyst. The product acid of such a plant is preferably obtained as 93% sulphuric acid and mixed with the spent pickle liquor as has been described.

The filtrate from the hot filtration of the ferrous sulphate monohydrate crystals is a liquor that is completely restored to its original sulphuric acid content but which contains in solution the ferrous sulphate that was added as copperas in the first step of the cycle. This amount of ferrous sulphate is preferably recovered and reused in treating further amounts of spent pickle liquor by any suitable means, such as by cooling, evaporating or both. In developing the process illustrated, we found that the cheapest method was simply to apply a vacuum to the hot filtrate and cool it by evaporation to about 5° C., thereby evaporating 11 tons of water without the application of heat. Of course, it is equally feasible to utilize a drum-type concentrator at this stage of the process; and in fact such a concentration would be preferred in many instances because it can be operated with the same supply of hot gases that is used in the preceding concentration step. The only essential feature of this stage of the process is that the amount of ferrous sulphate is separated from the filtrate as heptahydrate that is needed to maintain a saturated solution in the preceding filtration step, and it is evident that the filtrate may be cooled, or concentrated and cooled, by any suitable means to the point where this amount will crystallize out. When this is accomplished, the heptahydrate crystals are filtered off and returned to the first step of the process as indicated on the drawing.

The liquor obtained as filtrate from the cold filtration step is well suited for storage, for it is a relatively strong solution of sulphuric acid containing only the amount of ferrous sulphate that can be tolerated in the pickling process. This liquor may be added directly to the pickling tank as needed, and the water necessary for dilution can be either mixed with the liquor or added to the pickling tank as is found most desirable. This is indicated on the drawing by the addition of 52 tons of water, which does not allow for the water removed with the ferrous sulphate monohydrate, and it is understood that the remainder may be added to the pickling process as desired.

From the foregoing it will be seen that the embodiment of the invention illustrated and described in detail accomplishes all the objects thereof. A cyclic process is provided which is extremely flexible and can be modified through a wide range of equivalent steps to meet varying conditions in industry. In its basic features the process is simple to operate and requires no control other than the control of filtration temperatures and extent of concentration, both of which can be readily maintained by unskilled operators. In its more specific aspects, the invention also provides a method of regeneration and reuse of the sulphuric acid which can be carried out in relatively small units of standard equipment at a minimum of expense, thus making it possible for a steel mill pickling plant to be self-sustaining.

What we claim is:

1. In a method of regenerating spent ferrous sulphate liquors from the sulphuric acid treatment of ferrous material and recovering ferrous sulphate monohydrate therefrom the combination of steps which comprises first mixing with the spent liquor an amount of sulphuric acid sufficient to restore it to its original free acid content and a quantity of ferrous sulphate heptahydrate which would be just sufficient to maintain a saturated solution in the subsequent filtration step if no other iron were present, evaporating water from the resulting solution and then filtering off an amount of ferrous sulphate monohydrate chemically equivalent to the amount of acid added.

2. In a method of regenerating spent ferrous sulphate liquors from the sulphuric acid treatment of ferrous material and recovering ferrous sulphate monohydrate therefrom the combination of steps which comprises first mixing with the spent liquor an amount of sulphuric acid sufficient to restore it to its original free acid content and a quantity of ferrous sulphate heptahydrate which would be just sufficient to maintain a saturated solution in the subsequent filtration step if no other iron were present, evaporating water from the resulting solution and then filtering off at temperatures above 65° C. an amount of ferrous sulphate monohydrate chemically equivalent to the amount of acid added.

3. In a method of regenerating spent ferrous sulphate liquors from the sulphuric acid treatment of ferrous material and recovering ferrous sulphate monohydrate therefrom the combination of steps which comprises first mixing with the spent liquor an amount of sulphuric acid sufficient to restore it to its original free sulphuric acid content and a quantity of ferrous sulphate heptahydrate which would be just sufficient to maintain a saturated solution in the subsequent filtration of step (2) if no other iron were present, evaporating from the solution about six moles of water for each mole of ferrous sulphate to be removed therefrom, and then filtering off at temperatures of 90–100° C. an amount of ferrous sulphate monohydrate chemically equivalent to the amount of acid added.

4. In a method of regenerating ferrous sulphate liquors from the sulphuric acid treatment of ferrous material the combination of steps which comprises first adding sulphuric acid to the spent liquor and also adding ferrous sulphate heptahydrate thereto in amounts which would be just sufficient to maintain a saturated solution in the subsequent filtration step if no other iron were present, evaporating water from the resulting solution and then filtering off an amount of ferrous sulphate monohydrate equivalent to the amount produced in the sulphuric acid treatment of the ferrous material, recovering the sulphur content of the ferrous sulphate monohydrate as sulphuric acid, and returning at least a part of this acid to the spent liquor.

5. In a method of regenerating ferrous sulphate liquors from the sulphuric acid treatment of ferrous material the combination of steps which comprises first adding sulphuric acid to the spent liquor and also adding ferrous sulphate heptahydrate thereto in amounts which would be just sufficient to maintain a saturated solution in the subsequent filtration step if no other iron were present, evaporating water from the resulting solution and then filtering off at temperatures above 65° C. an amount of ferrous sulphate monohydrate equivalent to the amount produced in the sulphuric acid treatment of the ferrous material, recovering the sulphur content of the ferrous sulphate monohydrate as sulphuric acid, and returning at least a part of this acid to the spent liquor.

6. In a method of regenerating ferrous sulphate liquors from the sulphuric acid treatment of ferrous material the combination of steps which comprises first adding sulphuric acid to the spent liquor and also adding ferrous sulphate heptahydrate thereto in amounts which would be just sufficient to maintain a saturated solution in the subsequent filtration step if no other iron were present, evaporating from the solution about six moles of water for each mole of ferrous sulphate to be removed therefrom, and then filtering off at temperatures of 90–100° C. an amount of ferrous sulphate monohydrate equivalent to the amount produced in the sulphuric acid treatment of the ferrous material, recovering the sulphur content of the ferrous sulphate monohydrate as sulphuric acid, and returning at least a part of this acid to the spent liquor.

7. A method of regenerating spent pickle liquor and recovering ferrous sulphate monohydrate therefrom which comprises the successive steps of (1) mixing with the spent pickle liquor an amount of sulphuric acid sufficient to restore it to its original free acid content and the quantity of solid ferrous sulphate produced in step (3), (2) evaporating water from the resulting solution and filtering off at elevated temperatures an amount of ferrous sulphate monohydrate chemically equivalent to the amount of acid added, (3) cooling the filtrate and separating therefrom only so much solid ferrous sulphate as would be needed to maintain a saturated solution in the filtration of step (2) if no other iron were present, and returning the resulting solution to the pickling plant for reuse.

8. A method of regenerating spent pickle liquor and recovering ferrous sulphate monohydrate therefrom which comprises the successive steps of (1) mixing with the spent pickle liquor an amount of sulphuric acid sufficient to restore it to its original free acid content and the quantity of solid ferrous sulphate produced in step (3), (2) evaporating water from the resulting solution and filtering off at temperatures above 65° C. an amount of ferrous sulphate monohydrate chemically equivalent to the amount of acid added, (3) cooling the filtrate and separating therefrom only so much solid ferrous sulphate as would be needed to maintain a saturated solution in the filtration of step (2) if no other iron were present, and returning the resulting solution to the pickling plant for reuse.

9. A method of regenerating spent pickle liquor and recovering ferrous sulphate monohydrate therefrom which comprises the successive steps of (1) mixing with the spent pickle liquor an amount of sulphuric acid sufficient to restore it to its original free acid content and the quantity of solid ferrous sulphate produced in step (3), (2) evaporating from the resulting solution about six moles of water for each mole of ferrous sulphate to be removed therefrom, and filtering off at temperatures of 90–100° C. an amount of ferrous sulphate monohydrate chemically equivalent to the amount of acid added, (3) cooling the filtrate and separating therefrom only so much solid ferrous sulphate as would be needed to maintain a saturated solution in the filtration of step (2) if no other iron were present, and returning the resultant solution to the pickling plant for reuse.

10. A method of regenerating spent pickle liquor which comprises the successive steps of (1) mixing with the spent pickle liquor an amount of sulphuric acid sufficient to restore it to its original free acid content and the quantity of solid ferrous sulphate produced in step (4), (2) evaporating water from the resulting solution and filtering off at elevated temperatures an amount of ferrous sulphate monohydrate chemically equivalent to the amount of acid added, (3) recovering the sulphur content of the ferrous sulphate monohydrate as sulphuric acid and returning the acid to step (1), (4) cooling the filtrate from step (2) and separating therefrom only so much solid ferrous sulphate as would be needed to maintain a saturated solution in the filtration of step (2) if no other iron were present, and returning the resulting solution to the pickling plant for reuse.

11. A method according to claim 10 in which the ferrous sulphate monohydrate is mixed with carbon and roasted to produce sulphur dioxide, the sulphur dioxide is converted to sulphuric acid and the acid is mixed with the spent pickle liquor.

12. A method of regenerating spent pickle liquor and recovering ferrous sulphate monohydrate therefrom which comprises the successive steps of (1) mixing with the spent pickle liquor an amount of sulphuric acid sufficient to restore it to its original free acid content and the quantity of ferrous sulphate heptahydrate produced in step (4), (2) exaporating water from the resulting solution and filtering off at elevated temperatures an amount of ferrous sulphate monohydrate chemically equivalent to the amount of acid added, (3) applying a vacuum to the filtrate and thereby cooling and concentrating it to the point where the amount of ferrous sulphate heptahydrate will crystallize out that would be needed to maintain a saturated solution in the filtration of step (2) if no other iron were present, (4) filtering off the ferrous sulphate heptahydrate and returning it to step (1), and returning the resulting solution to the pickling plant for reuse.

13. A method of regenerating spent pickle liquor which comprises the successive steps of (1) mixing with the spent pickle liquor an amount of sulphuric acid sufficient to restore it to its original free acid content and the quantity of ferrous sulphate heptahydrate produced in step (5), (2) evaporating water from the resulting solution and filtering off at temperatures above 64° C. an amount of ferrous sulphate monohydrate chemically equivalent to the amount of acid added, (3) recovering the sulphur content of the ferrous sulphate monohydrate as sulphuric acid and returning the acid to step (1), (4) applying a vacuum to the filtrate and thereby cooling and concentrating it to the point where the amount of ferrous sulphate heptahydrate will crystallize out that would be needed to maintain a saturated solution in the filtration of step (2) if no other iron were present, (5) separating the ferrous sulphate heptahydrate and returning it to step (1), and returning the resulting solution to the pickling plant for reuse.

14. A method according to claim 13, in which the ferrous sulphate monohydrate is mixed with carbon and roasted to produce sulphur dioxide, the sulphur dioxide is converted to sulphuric acid and the acid is mixed with the spent pickle liquor.

15. A method of regenerating spent pickle liquor and recovering ferrous sulphate monohydrate therefrom which comprises the successive steps of (1) adding sulphuric acid and ferrous sulphate heptahydrate to said spent pickle liquor, (2) evaporating from the resulting solution a quantity of water such that upon filtration at temperature of 90–100° C. an amount of ferrous sulphate will be removed as monohydrate equal to the amount formed in the pickling process, (3) filtering the solution at 90–100° C. and thereby recovering ferrous sulphate monohydrate, (4) cooling the filtrate and separating therefrom only so much ferrous sulphate heptahydrate as would be needed to maintain a saturated solution in the filtration of step (3) if no other iron were present, and (5) returning the separated ferrous sulphate heptahydrate to step (1) and returning the resulting acid liquor to the pickling process.

16. A method according to claim 15 in which the ferrous sulphate monohydrate is mixed with carbon and roasted to produce sulphur dioxide, the sulphur dioxide is converted to sulphuric acid and the acid is mixed with the spent pickle liquor.

17. A method of regenerating spent pickle liquor which comprises the successive steps of (1) adding sulphuric acid and ferrous sulphate heptahydrate to said spent pickle liquor, (2) evaporating from the resulting solution a quantity of water such that upon filtration at temperatures of 90–100° C. an amount of ferrous sulphate will be removed as monohydrate equal to the amount formed in the pickling process, (3) filtering the solution at 90–100° C. and thereby recovering ferrous sulphate monohydrate, (4) recovering the sulphur content of the ferrous sulphate monohydrate as sulphuric acid for reuse in the process, (5) applying a vacuum to the filtrate and thereby cooling and concentrating it to the point where the amount of ferrous sulphate heptahydrate will crystallize out that would be needed to maintain a saturated solution in the filtration of step (3) if no other iron were present, (6) separating the ferrous sulphate heptahydrate and returning it to step (1), and returning the resulting acid liquor to the pickling plant for reuse.

ROWLAND P. SMITH.
JOHN BELDING.